Jan. 12, 1954

B. G. BLACKMAN
STYLUS MOVING AND GUIDING STRUCTURE
FOR ELECTRICAL RECORDERS
Filed Oct. 24, 1949

2,665,965

INVENTOR
BIRT G. BLACKMAN
BY [signature]
ATTORNEY

Patented Jan. 12, 1954

2,665,965

UNITED STATES PATENT OFFICE 2,665,965

STYLUS MOVING AND GUIDING STRUCTURE FOR ELECTRICAL RECORDERS

Birt Griffin Blackman, Los Angeles, Calif., assignor to Bendix Aviation Corporation, South Bend, Ind., a corporation of Delaware Application October 24, 1949, Serial No. 123,220

1 Claim. (Cl. 346—139)

Figure 1:
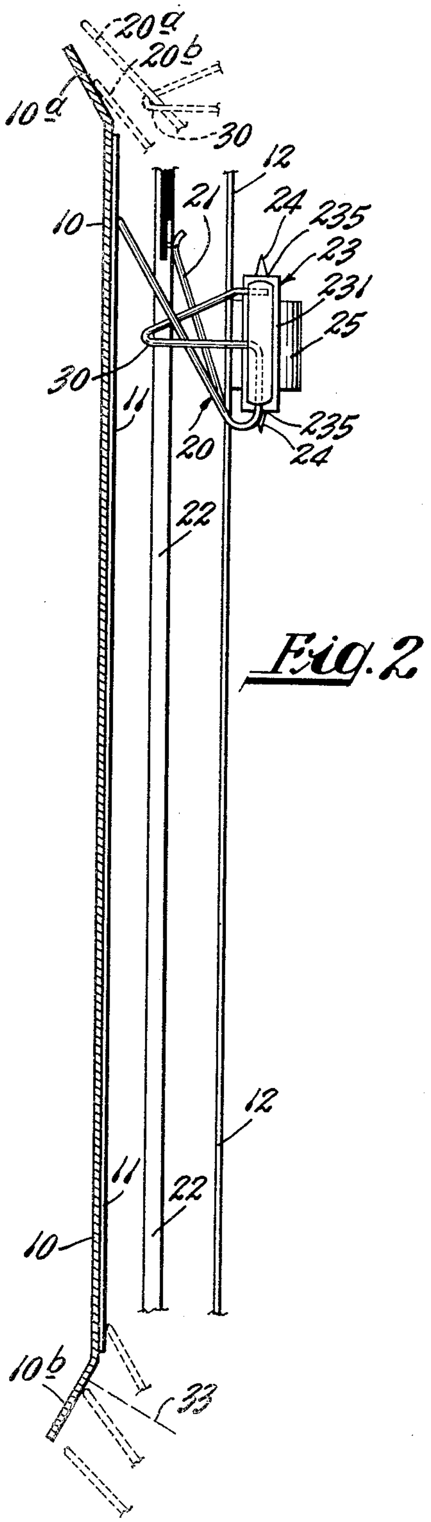
Figure 1:
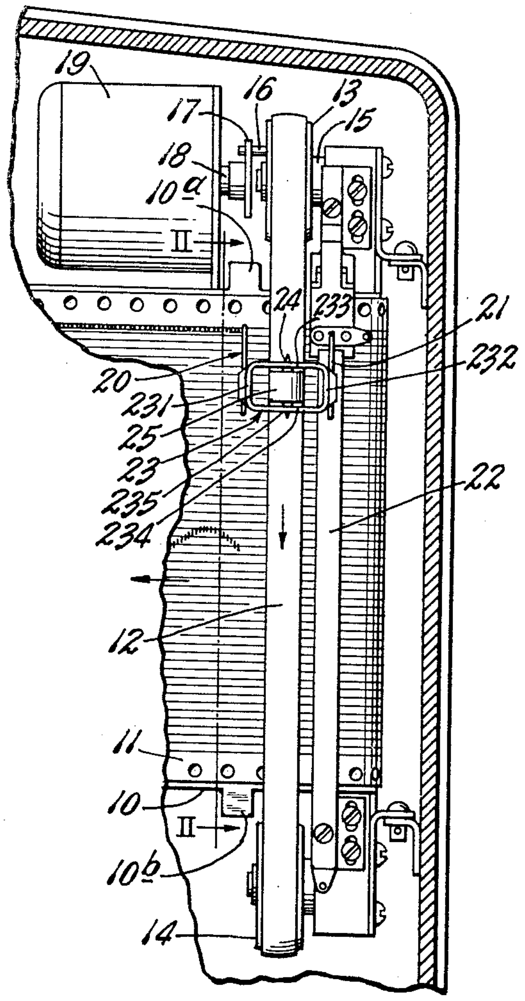

This invention relates to electrical recorders of the type in which a resilient electrically conductive stylus is continually moved through a closed path in a portion of which it traverses a slowly moving paper record tape or strip and produces a mark thereon in response to an electrical discharge.

An object of the invention is to reduce vibration of the stylus in a recorder of the type referred to and thereby prolong the life of the stylus.

In recorders of the type referred to, the record strip is supported by a rigid backing plate where the stylus traverses it, the plate usually extending slightly beyond the edges of the record strip, and the stylus is of such length that it is bent substantially as it rides across the plate and the record strip, to insure firm contact with the strip for a prolonged period of operation despite the wearing away of the stylus tip that normally occurs. The result has been that the leading edge of the plate intercepted the stylus at a point above its tip, with a sharp impact, the stylus bending rapidly as it rode over the edge of the plate. Furthermore, as the stylus rode off the trailing edge of the plate it suddenly snapped free, with resultant vibration. This repeated impact of the stylus at the leading edge of the strip, and snap action at the trailing edge thereof, sometimes caused the stylus to fatigue and break. The trouble was accentuated in recorders requiring high speed movement of the stylus.

In accordance with the present invention, stylus life is greatly lengthened by providing guides consisting of inclined ramps extending away from the path of the stylus at a low angle from the leading and trailing edges of the backing plate. The guide at the leading edge reduces impact by contacting the tip only of the stylus and gradually bending the stylus as the tip rides up the guide onto the plate. The guide at the trailing edge reduces or eliminates free vibration of the stylus by permitting the stylus to unbend only gradually as the tip rides down the guide. The result is great reduction of the stresses applied to the stylus and increased life thereof without reducing the stylus pressure against the record strip.

A full understanding of the invention may be had from the following detailed description which refers to the drawing.

In the drawing:

Fig. 1 is a front elevational view of a portion of an electrical depth recorder incorporating the invention; and Fig. 2 is a vertical sectional view taken in the plane II—II of Fig. 1.

Referring to Fig. 1, the recorder therein depicted comprises a backing plate 10 over which a record strip 11, usually of paper, is fed slowly from right to left by any suitable paper-moving mechanism. A depth recorder of this type is fully disclosed in H. A. Stamper, D. O. Nelson and J. A. Wippert application Serial No. 29,146, filed May 25, 1948, now Patent No. 2,597,199, May 20, 1952, and reference is made to that application if further information is desired on the details of operation of such a recorder. Since the present invention relates only to the stylus structure and the structure for supporting the paper in the path of the stylus, it is not necessary to fully describe the recorder.

The portion of the recorder illustrated in Fig. 1 comprises, in addition to the record strip 11 and the backing plate 10 therefor, a belt 12 which is stretched between upper and lower pulleys 13 and 14 respectively. The pulley 13 is supported on a suitable bearing from a bracket 15 and is coupled, by a pin 16 projecting from its left side, and a slotted disc 17, to the shaft 18 of a driving motor 19 for driving the belt 12 at constant speed. The lower pulley 14 is merely an idler pulley to maintain the belt in taut condition. A stylus 20 and a brush 21 are mounted on the belt 12, which periodically drags the stylus 20 across the record strip 11, and drags brush 21 across suitable cooperating electrical elements for actuating a transmitting circuit associated with the recorder and for completing electrical connection to the stylus 20. Thus, during traverse of the strip 11 by the stylus 20, the brush 21 rides along a conductive track 22 which is electrically connected to a circuit for supplying a potential to the stylus 20 to produce a mark on the record strip 11. The location of such mark is determined by the position of the stylus on the paper at the time the potential is applied.

As shown in Figs. 1 and 2, the stylus 20 and the wire brush 21 are secured as by soldering to opposite sides 231 and 232 respectively of a rectangular metal frame 23 constituting a stylus carriage. The other sides 233 and 234 of the frame 23 have pivot apertures 235 therein which are engaged by the conical ends of a pivot bar 24, the mid portion of which is embedded in a block 25 of rubber or the like which is secured, as by vulcanizing, to the belt 12. The block 25 is preferably of soft flexible material so that it can distort to conform to the curvature of the pulleys 13 and 14 as it passes therearound.

The structure including the pivot 24 and the frame 23 constitutes a light-weight support for the stylus 20 and brush 21 that rocks as necessary to retain the stylus 20 against the record strip 11 and retain the brush 21 against its cooperating parts including the track 22.

As best shown in Fig. 2, the stylus 20 extends rearwardly from the front edge of the carriage 23 at an angle of approximately 45 degrees to the record strip 11 during its passage thereover, and to insure firm contact with the record strip, the stylus 20 is substantially deflected from its normal position by the record strip. Thus the position and angular direction of the stylus 20 during the free portion of its travel is illustrated in dotted lines at 20*a*, under which conditions its position may be limited by engagement against a stop member 30.

The structure so far described is essentially the same as that disclosed in the Hamilton, Nelson and Wippert application Serial No. 29,146 previously referred to, and in an application of D. O. Nelson, Serial No. 72,581, filed January 25, 1949, and issued June 19, 1951, as Patent 2,557,196 for a stylus structure for electrical recorder. This stylus structure, however, was previously employed in recorders in which the backing plate 10 terminated substantially in the plane of the record strip. In this prior arrangement, when the stylus approached the recording position, the intermediate portion of the stylus first contacted the edge of the backing plate, the edge of the backing plate then sliding along the stylus as the latter moved onto the record strip. This resulted in a very abrupt deflection of the stylus at the instant it encountered the leading edge of the backing plate. Likewise, as the tip of the stylus passed off the trailing edge of the backing plate, it was instantaneously released, permitting the stylus to snap suddenly against the stop 30 with resultant vibration.

It is to be understood that the provision of the stop 30, which constitutes the invention claimed in Patent 2,557,196, reduced the vibration of the stylus over what it was with the structure shown in the earlier application, Serial No. 29,146, and increased the life of the stylus sufficiently for practical purposes in recorders operating within certain relatively low speed ranges, and represented a practical advance in the art over a stylus having no rest corresponding to that shown in application Serial No. 29,146. However, when it was attempted to run these recorders at higher speeds, the vibrations of the stylus were greatly increased and its life reduced, despite the vibration-dampening effect of the rest 30.

The present invention consists in providing, at the leading and lagging edges of the backing plate 10, angularly extending ramps or guides 10*a* and 10*b* which contact the tip of the stylus during transit of the latter onto and off of the backing plate, deflecting the stylus gradually as it moves onto the record strip, and permitting it to restore or unbend only gradually after it leaves the record strip.

To obtain this result, the angle of the approach guide 10*a* to the backing plate 10 is made less than the angle of the stylus to the path of the carriage 23 and to the backing plate, prior to its contact therewith, as shown in dotted lines at 20*a*. This insures that only the tip of the stylus will contact the guide 10*a*, as shown in the drawing at 20*b*, so that the stylus is bent gradually over a period of time as its tip rides over the inclined approach guide 10*a* and onto the record strip 11.

The guide 10*b* at the trailing edge of the backing plate, in order to perform any useful function, must be so inclined that a line normal thereto, i. e. the line 33 in Fig. 2 of the drawing, is at a greater angle to the path of the carriage 23 (and to the backing plate 10) than is the stylus throughout its transit over the guide 10*b*. Stated another way, the normal angle of the stylus to the path of travel of the carriage 23 must be less than the complement of the angle between the carriage path and the surface of the guide 10*b*. This follows from the obvious fact that the angle between the normal line 33 and the path of the carriage 23 is the complement of the angle between the guide 10*b* itself and the carriage path. So long as the prescribed condition is maintained, the stylus tip will ride on the guide 10*b* and a gradual restoration of the stylus to its normal position will occur. On the other hand, if the inclination of the guide 10*b* with respect to the backing plate 10 where increased to the point where its normal (line 33) was at a lower angle to the backing plate 10 than the stylus, then the tip of the stylus would snap clear of the guide as it leaves the lower end of the backing plate 10.

The best angle for the guides 10*a* and 10*b* can be determined by experiment, too steep an angle defeating the purpose of the invention, and too small an angle necessitating that the guides be of greater length than would otherwise be required to achieve the purpose.

As shown in Fig. 2, the guides 10*a* and 10*b* are formed integrally with the backing plate 10, merely constituting short extensions or ears extending therefrom at the upper and lower edges. However any convenient construction thereof may be employed, the only requirement being to provide a surface of proper angle with which the stylus tip contacts at its approach to and departure from the record strip.

Although for the purpose of explaining the invention, a particular embodiment thereof has been shown and described, obvious modifications will occur to a person skilled in the art, and I do not desire to be limited to the exact details shown and described.

I claim:

Electrical recording apparatus comprising: means for supporting and feeding a record strip in transversely flat shape past a recording position; a stylus carriage and means for moving it through a closed path a portion of which path is parallel to said strip at said recording position; a spring wire stylus carried by said carriage and projecting therefrom with its tip in contact with said record strip during movement of said carriage through said portion of its path, said stylus being of such length and inclination as to be substantially bent from its normal shape into a recording shape by its contact with said record strip during its transit thereover; and stylus guiding means in the path of said stylus beyond the trailing edge of said record strip, said guiding means having a stylus tip-contacting planar surface inclined at an acute angle away from said parallel portion of said stylus carriage path in the direction of travel of the carriage whereby said stylus gradually unbends from said recording shape to said normal shape after leaving the trailing edge of the record strip and during transit over said guiding means, and a second stylus guiding means in the path of said stylus at the leading edge of said record strip and having a stylus contacting surface inclined toward said parallel portion of said stylus carriage path in the direction of travel of the carriage, said stylus in its normal shape extending at an acute angle rearwardly and laterally from said carriage with respect to the path of movement of the carriage, and said angle being greater than the angle between said path and said second stylus-guiding means.

BIRT GRIFFIN BLACKMAN.

References Cited in the file of this patent

UNITED STATES PATENTS

| Number | Name | Date |
|---|---|---|
| 899,043 | Harris | Sept. 22, 1908 |
| 2,212,970 | Finch | Aug. 27, 1940 |
| 2,278,919 | Erickson et al. | Apr. 7, 1942 |
| 2,366,383 | Cameron | Jan. 2, 1945 |
| 2,501,236 | Ryan et al. | Mar. 21, 1950 |
| 2,557,196 | Nelson | June 19, 1951 |